United States Patent
Nobayashi

(10) Patent No.: US 10,339,665 B2
(45) Date of Patent: Jul. 2, 2019

(54) POSITIONAL SHIFT AMOUNT CALCULATION APPARATUS AND IMAGING APPARATUS

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 15/508,625

(22) PCT Filed: Sep. 3, 2015

(86) PCT No.: PCT/JP2015/004474
§ 371 (c)(1),
(2) Date: Mar. 3, 2017

(87) PCT Pub. No.: WO2016/042721
PCT Pub. Date: Mar. 24, 2016

(65) Prior Publication Data
US 2017/0270688 A1 Sep. 21, 2017

(30) Foreign Application Priority Data

Sep. 17, 2014 (JP) .................................. 2014-188472
Aug. 5, 2015 (JP) .................................. 2015-155151

(51) Int. Cl.
*G06K 9/00* (2006.01)
*G06T 7/70* (2017.01)
(Continued)

(52) U.S. Cl.
CPC .................. *G06T 7/70* (2017.01); *G01C 3/08* (2013.01); *G02B 7/34* (2013.01); *G03B 13/36* (2013.01);
(Continued)

(58) Field of Classification Search
CPC . G06T 2207/10016; G06T 2207/10116; A61B 8/14; A61B 8/461; A61B 8/462;
(Continued)

(56) References Cited

U.S. PATENT DOCUMENTS 4,812,869 A    3/1989   Akashi et al.
7,411,626 B2 *   8/2008   Ueda .................... H04N 3/1587
                                                                348/222.1
(Continued)

FOREIGN PATENT DOCUMENTS

JP    H10-283474 A    10/1998
JP    2007-233032 A    9/2007
(Continued)

OTHER PUBLICATIONS

Notification of and International Preliminary Report on Patentability dated Mar. 21, 2017, and dated Mar. 30, 2017, in corresponding International Patent Application No. PCT/JP2015/004474.
(Continued)

*Primary Examiner* — Charlotte M Baker
(74) *Attorney, Agent, or Firm* — Venable LLP

(57) ABSTRACT

A positional shift amount calculation apparatus that calculates a positional shift amount, which is a relative positional shift amount between a first image, based on a luminous flux that has passed through a first imaging optical system, and a second image. A calculation unit calculates a positional shift amount based on data within a predetermined area out of first image data representing first and second image data. A setting unit sets a relative size of the area to the first and second image data. The calculation unit calculates a first positional shift amount using the first and second image data in the area having a first size that is preset. The setting unit sets a second size of the area based on the size of the first positional shift amount and an optical characteristic of the first imaging optical system. The calculation unit then calculates a second positional shift amount.

16 Claims, 13 Drawing Sheets

(51) Int. Cl.
  *G01C 3/08* (2006.01)
  *G02B 7/34* (2006.01)
  *G03B 13/36* (2006.01)
  *G03B 35/06* (2006.01)
  *G06T 7/571* (2017.01)
  *H04N 5/232* (2006.01)
  *G06T 7/593* (2017.01)

(52) U.S. Cl.
  CPC .............. *G03B 35/06* (2013.01); *G06T 7/571* (2017.01); *G06T 7/593* (2017.01); *H04N 5/23212* (2013.01); *G06T 2207/10004* (2013.01); *G06T 2207/10016* (2013.01)

(58) Field of Classification Search
  CPC ....... H01L 2924/00; H01L 2924/00014; H01L 2924/181; H01L 2924/13055
  USPC ............ 382/106, 294, 128; 399/44, 301, 49; 348/364, 222.1, 297, 333.11, 79, E3.031, 348/E5.047, E9.01
  See application file for complete search history.

(56) References Cited

U.S. PATENT DOCUMENTS

| | | |
|---|---|---|
| 7,792,420 B2 | 9/2010 | Kusaka |
| 8,548,226 B2 | 10/2013 | Sakano et al. |
| 8,842,936 B2 * | 9/2014 | Kawamura ........... G06T 3/0068 382/294 |
| 9,279,677 B2 | 3/2016 | Fujiwara |
| 2014/0009577 A1 | 1/2014 | Wakabayashi et al. |
| 2014/0247344 A1 | 9/2014 | Fujiwara |

FOREIGN PATENT DOCUMENTS

| | | |
|---|---|---|
| JP | 2008-134641 A | 6/2008 |
| JP | 2010-117593 A | 5/2010 |
| JP | 2011-013706 A | 1/2011 |
| JP | 2014-038151 A | 2/2014 |

OTHER PUBLICATIONS

Notification of and International Search Report and Written Opinion dated Dec. 8, 2015, in corresponding International Patent Application No. PCT/JP2015/004474.

Kanade, Takeo, et al., A Stereo Matching Algorithm with an Adaptive Window: Theory and Experiment, Proceedings of the 1991 IEEE International Conference on Robotics and Automation, Apr. 1991, pp. 1088-1095, Sacramento, California.

Okutomi, Masatoshi, et al., A Locally Adaptive Window for Signal Matching, International Journal of Computer Vision, Jan. 1992, pp. 143-162, 7:2, Norwell, Massachusetts.

Search Report dated Apr. 5, 2018, issued in corresponding European Patent Application No. 15842093.5.

* cited by examiner

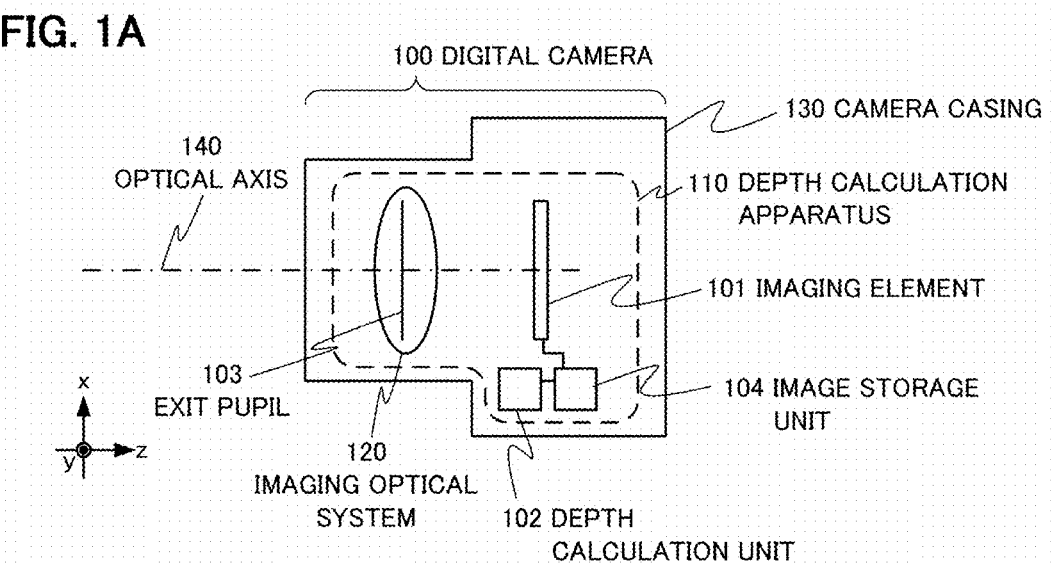
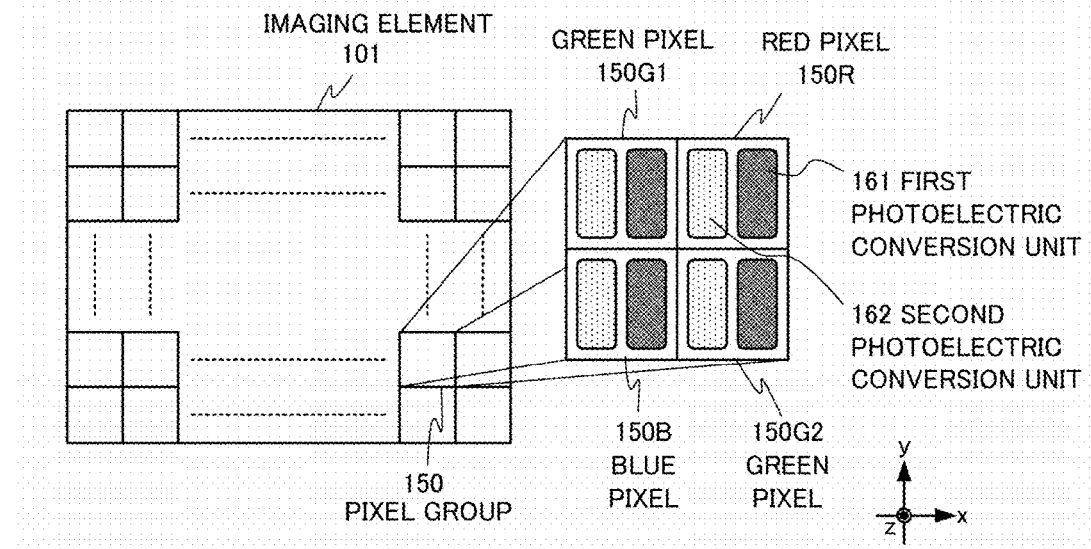

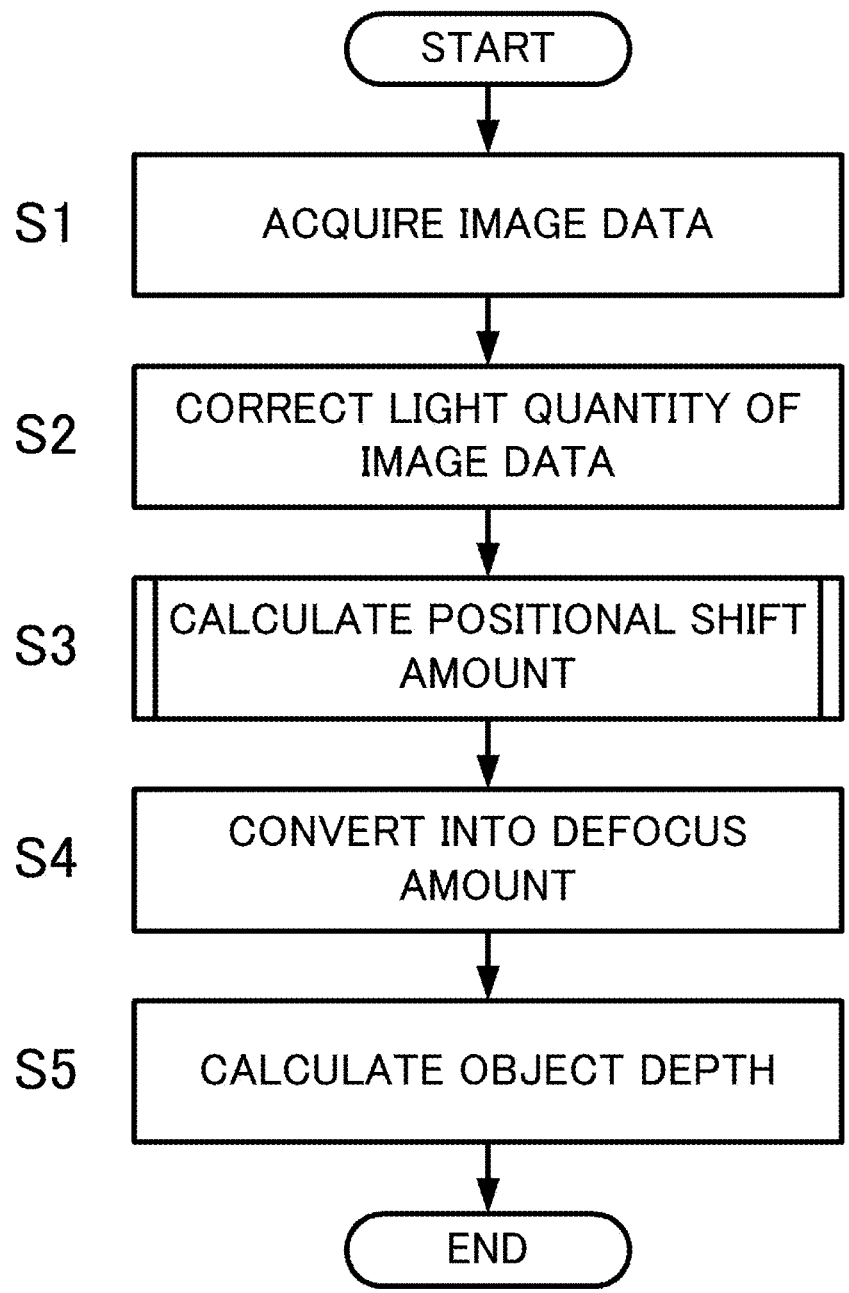

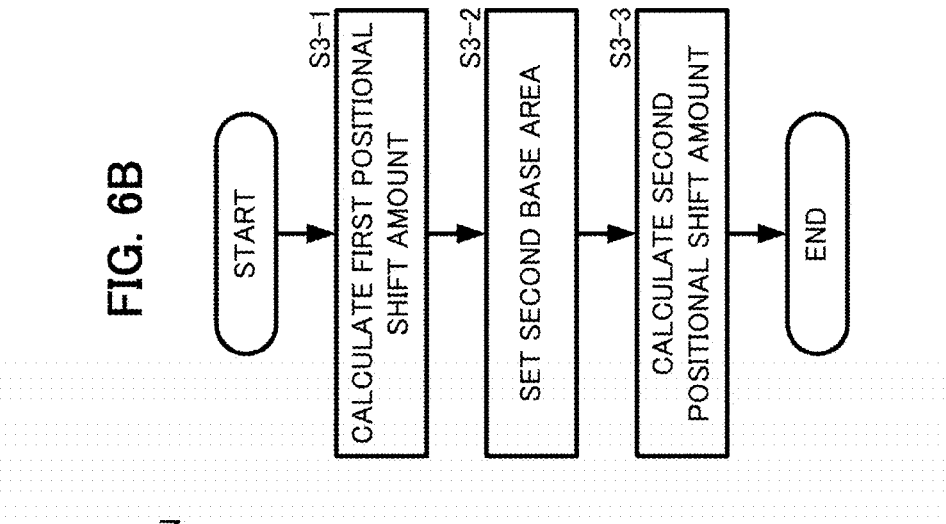
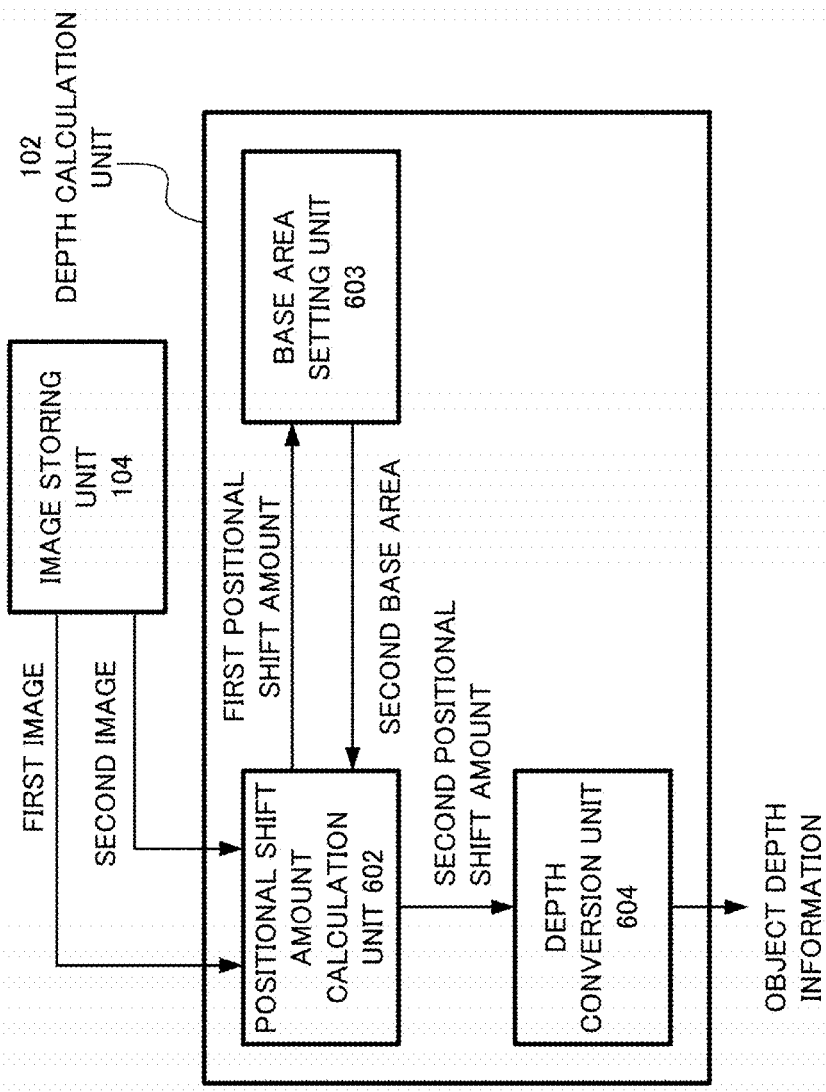

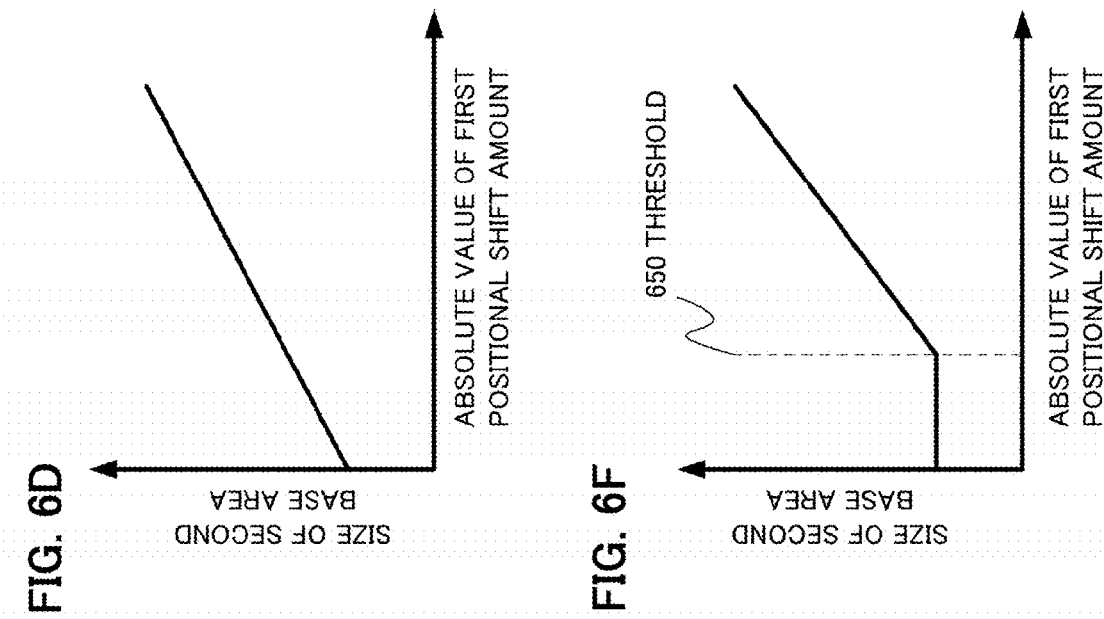
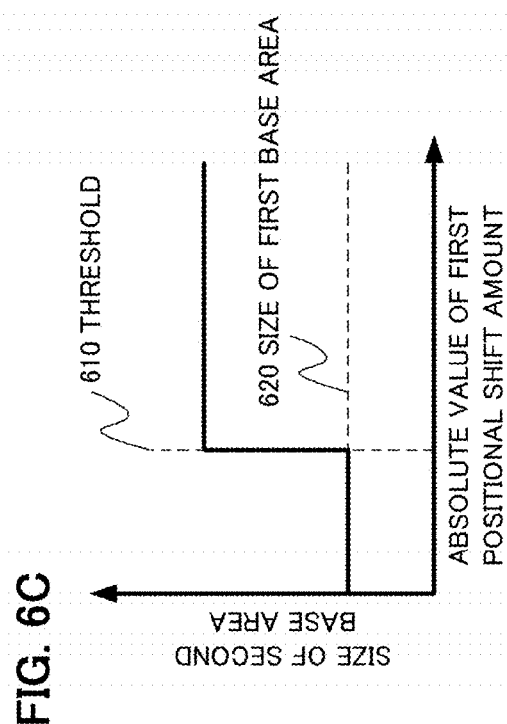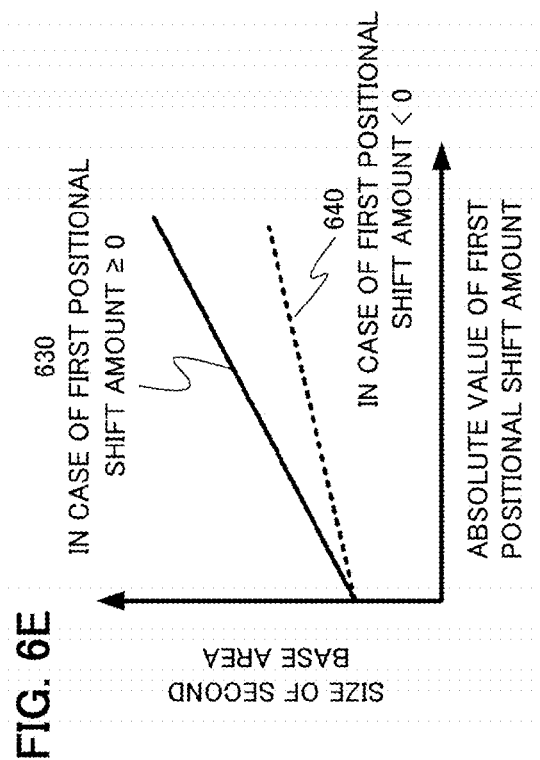

POSITIONAL SHIFT AMOUNT CALCULATION APPARATUS AND IMAGING APPARATUS

CLAIM TO PRIORITY

This application is a national stage application of International Patent Application No. PCT/JP2015/004474, filed Sep. 3, 2015, which claims the benefit of Japanese Patent Application No. 2014-188472, filed on Sep. 17, 2014, and Japanese Patent Application No. 2015-155151, filed on Aug. 5, 2015, which are hereby incorporated by reference herein in their entireties.

BACKGROUND OF THE INVENTION

Field of the Invention

The present invention relates to a technique to calculate the positional shift amount between images.

Description of the Related Art

A known depth measuring apparatus measures depth by calculating a positional shift amount (also called "parallax"), which is a relative positional shift amount between two images having different points of view (hereafter called "image A" and "image B"). To calculate the positional shift amount, an area-based corresponding points search technique called "template matching" is often used. In template matching, either image A or image B is set as a base image, and the other image, which is not the base image, is set as a reference image. A base area around a target point (also called "base window") is set on the base image, and a reference area around a reference point corresponding to the target point (also called "reference window") is set on the reference image. The base area and the reference area are collectively called "matching windows". A reference point at which the similarity of an image in the base area and an image in the reference area is highest (correlation thereof is highest) is searched for while sequentially moving the reference point, and the positional shift amount is calculated using the relative positional shift amount between the target point and the reference point. Generally, a calculation error occurs to the positional shift amount due to a local mathematical operation if the size of the base area is small. Hence, a relatively large area size is used.

The depth (distance) to an object can be calculated by converting the positional shift amount into a defocus amount or into an object depth using a conversion coefficient. This allows measuring the depth at high-speed and at high accuracy, since it is unnecessary to move the lens to measure the depth.

The depth measurement accuracy improves by accurately determining the positional shift amount. Factors that cause an error to the positional shift amount are changes of the positional shift amount in each pixel of the base area, and noise generated in the process of acquiring image data. To minimize the influence of the changes of the positional shift amount in the base area, the base area must be small. If the base area is small, however, a calculation error to the positional shift amount may be generated by the influence of noise or because of the existence of similar image patterns.

In Japanese Patent Application Laid-Open No. 2011-013706, the positional shift amount is calculated for each scanning line (e.g., a horizontal line), and the positional shift amount at the adjacent scanning line is calculated based on the calculated positional shift amount data. In this case, a method of setting a base area independently for each pixel, so that a boundary where the calculated positional shift amount changes is not included, has been proposed.

In Japanese Patent Application Laid-Open No. H10-283474, a method of decreasing the size of the base area in steps and gradually limiting the search range to search for a corresponding point is proposed.

SUMMARY OF THE INVENTION

A problem of the positional shift amount calculation method disclosed in Japanese Patent Application Laid-Open No. 2011-013706, however, is that the memory amount and computation amount required for calculating the positional shift amount are large. This is because the positional shift amount of a spatially adjacent area is calculated and evaluated in advance to determine the size of the base area. Furthermore, in a case when the positional shift amount changes continuously, the base area becomes small since the base area is set in a range where the positional shift amount is approximately the same, and a calculation error may occur to the positional shift amount. In other words, the depth may be miscalculated depending on the way of changing the object depth.

A problem of the positional shift amount calculating method disclosed in Japanese Patent Application Laid-Open No. H10-283474 is that the computation amount is large since a plurality of base areas is set at each pixel position, and the correlation degree is evaluated.

With the foregoing in view, it is an object of the present invention to provide a technique that can calculate the positional shift amount at high accuracy by an easy operation.

Solution to Problem

A first aspect of the present invention is to provide a positional shift amount calculation apparatus that calculates a positional shift amount, which is a relative positional shift amount between a first image based on a luminous flux that has passed through a first imaging optical system, and a second image, the apparatus having a calculation unit adapted to calculate the positional shift amount based on data within a predetermined area out of first image data representing the first image and second image data representing the second image, and a setting unit adapted to set a relative size of the area to the first and second image data, and in this positional shift amount calculation apparatus, the calculation unit being adapted to calculate a first positional shift amount using the first image data and the second image data in the area having a first size which is preset, the setting unit being adapted to set a second size of the area based on the size of the first positional shift amount and an optical characteristic of the first imaging optical system, and the calculation unit being adapted to calculate a second positional shift amount using the first image data and the second image data in the area having the second size.

A second aspect of the present invention is to provide a positional shift amount calculation method for a positional shift amount calculation apparatus to calculate a positional shift amount, which is a relative positional shift amount between a first image based on a luminous flux that has passed through a first imaging optical system, and a second image, the method having a first calculation step of calculating a first positional shift amount based on data within an area having a predetermined first size, out of first image data representing the first image and second image data representing the second image, a setting step of setting a second size, which is a relative size of the area to the first and second image data, based on the size of the first positional shift amount and an optical characteristic of the first imaging optical system, and a second calculation step of calculating a second positional shift amount using the first image data and the second image data in the area having the second size.

Advantageous Effects of Invention

According to the present invention, the positional shift amount can be calculated at high accuracy by an easy operation.

Further features of the present invention will become apparent from the following description of exemplary embodiments with reference to the attached drawings.

BRIEF DESCRIPTION OF THE DRAWINGS

FIG. 1A and FIG. 1B are diagrams depicting a configuration of a digital camera that includes a depth calculation apparatus.

FIG. 3 is a flow chart depicting a depth calculation procedure according to the first embodiment.

FIG. 6A and FIG. 6B are diagrams depicting a depth calculation unit according to the first embodiment.

FIG. 6C to FIG. 6F are diagrams depicting a size of a second base area according to the first positional shift amount.

DESCRIPTION OF THE PREFERRED EMBODIMENTS

Figure 2:
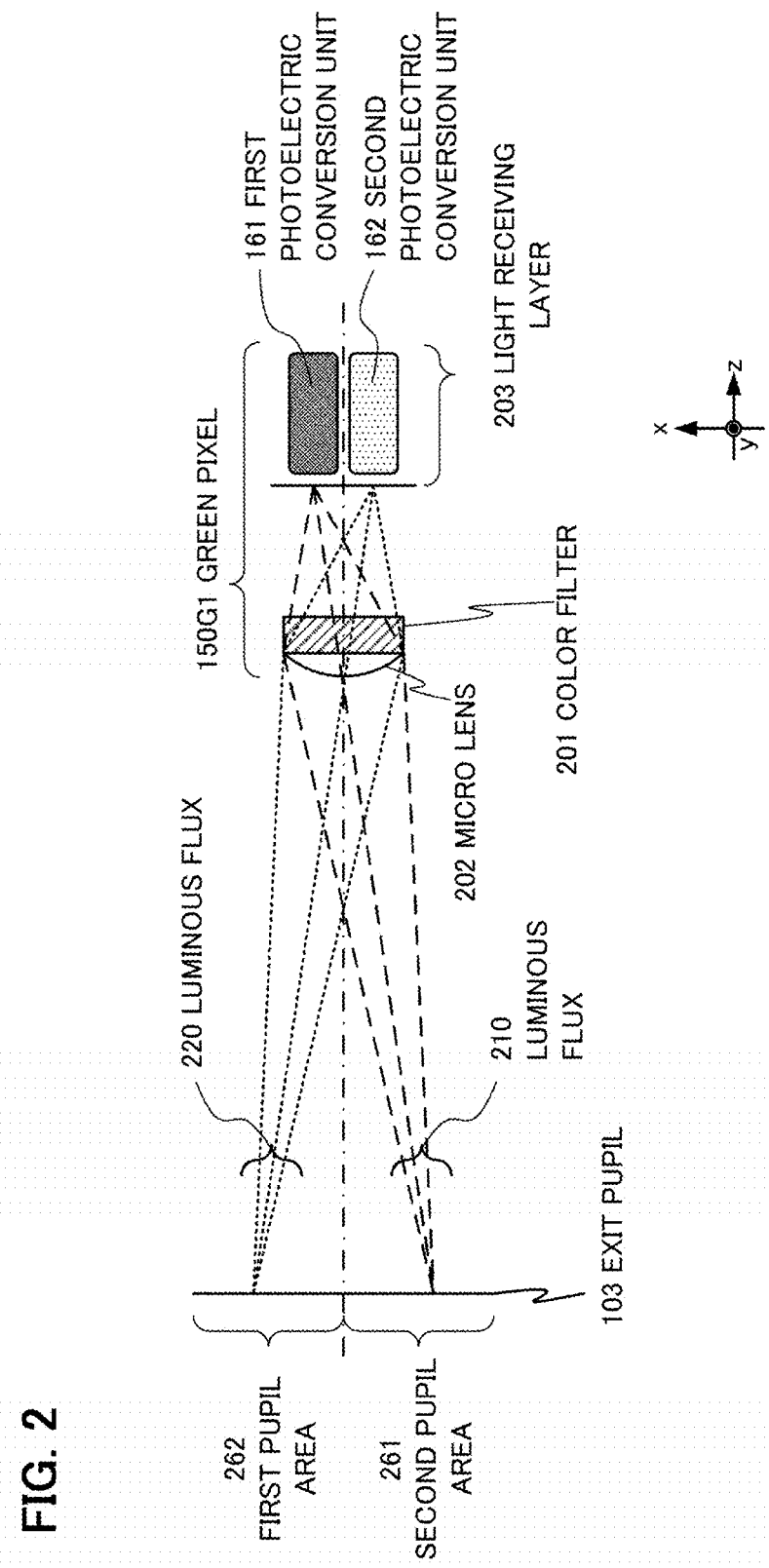
FIG. 2 is a diagram depicting a luminous flux that the digital camera receives.

Embodiments of the present invention will now be described with reference to the drawings. In the following description, a digital camera is described as an example of an imaging apparatus that includes a depth calculation apparatus (positional shift calculation apparatus), but application of the present invention is not limited to this. For example, the positional shift amount calculation apparatus of the present invention can be applied to a digital depth measuring instrument.

In the description with reference to the drawings, as a rule, a same segment is denoted by a same reference number, even if the figure number is different, and a redundant description is minimized.

First Embodiment

<Configuration of a Digital Camera>

FIG. 1A is a diagram depicting a configuration of a digital camera 100 that includes a depth measurement apparatus. In the digital camera 100, an imaging optical system 120, an imaging element 101, a depth calculation unit 102, an image storage unit 104, an image generation unit (not illustrated), a lens driving control unit (not illustrated), and a control unit (not illustrated) are disposed inside a camera casing 130. The imaging optical system 120, the imaging element 101, the depth calculation unit 102, and the image storage unit 104 constitute a depth calculation apparatus 110. The depth calculation unit 102 can be constructed using a logic circuit. As another mode, the depth calculation unit 102 may be constituted by a central processing unit (CPU) and a memory storing arithmetic processing programs. The depth calculation unit 102 corresponds to the positional shift amount calculation apparatus according to the present invention.

The imaging optical system 120 is a photographing lens of the digital camera 100, and has a function to form an image of the object on the imaging element 101, which is an imaging surface. The imaging optical system 120 is constituted by a plurality of lens groups (not illustrated) and a diaphragm (not illustrated), and has an exit pupil 103 at a position apart from the imaging element 101 by a predetermined distance. Reference number 140 in FIG. 1A denotes an optical axis of the imaging optical system 120, and, in this description, the optical axis is assumed to be parallel with the z axis. The x axis and the y axis are assumed to be orthogonal to each other, and are orthogonal to the optical axis.

Figure 9:
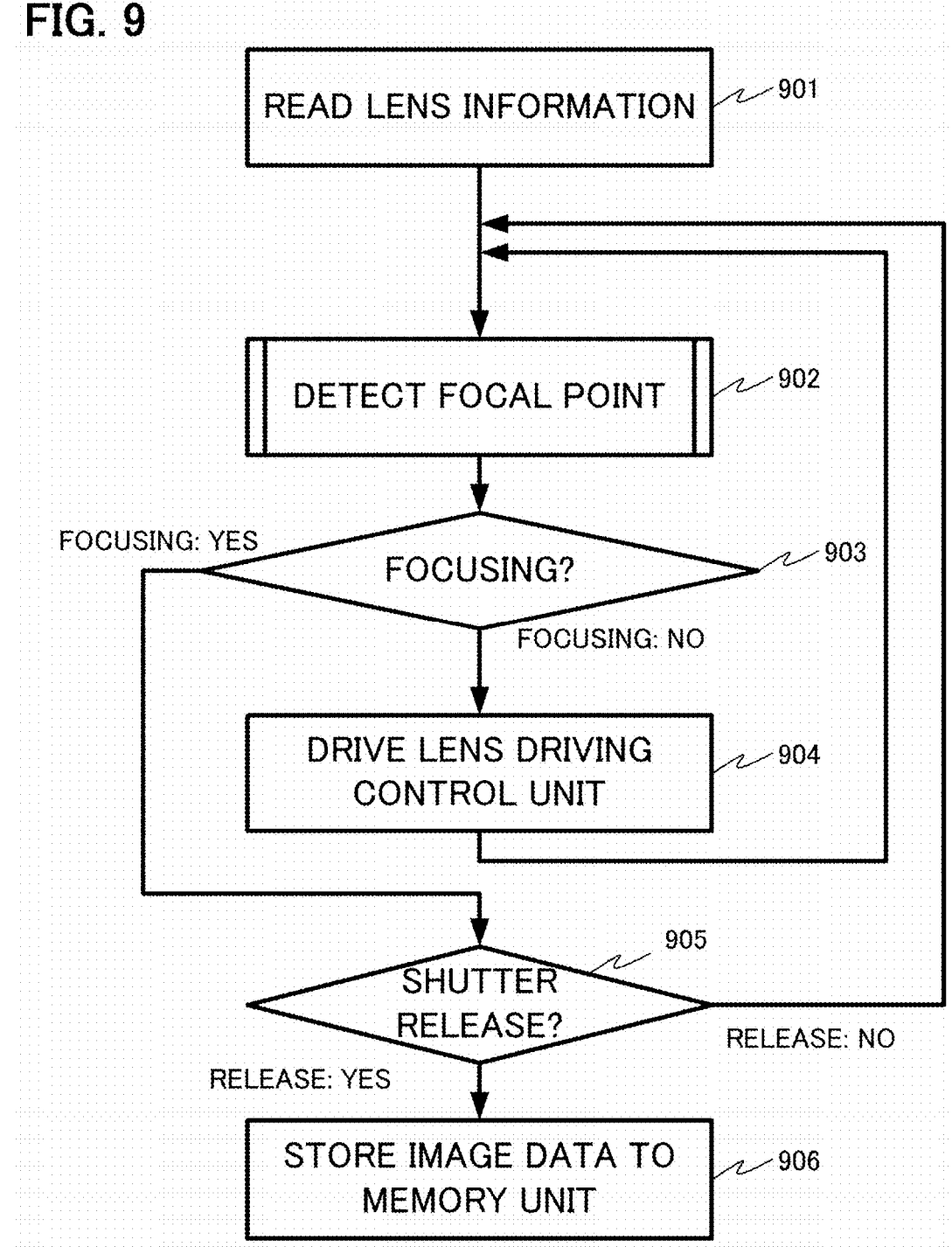
FIG. 9 is a flow chart depicting a general operation of the digital camera.

An operation example of this digital camera 100 will now be described with reference to FIG. 9. The following is merely an example, and operation of the digital camera 100 is not limited to this example. FIG. 9 is a flow chart depicting an operation flow after the main power of the digital camera 100 is turned ON and the shutter button (not illustrated) is half depressed. First, in step S901, the control unit reads the information on the imaging optical system 120 (e.g., focal length, diaphragm value), and stores the information in the memory unit (not illustrated). Then, the control unit executes the processing in steps S902, S903, and S904 to adjust the focal point. In other words, in step S902, the depth calculation unit 102 calculates a defocus amount using the depth calculation procedure shown in FIG. 3, based on the image data outputted from the imaging element 101. The depth calculation procedure will be described in detail later. In step S903, the control unit determines whether the imaging optical system 120 is in the focused state or not based on the calculated defocus amount. If not focused, the control unit drives the imaging optical system 120 to the focused position based on the defocus amount using the lens driving control unit, and then, processing returns to step S902. If it is determined that the imaging optical system 120 is in the focused state in step S903, the control unit determines whether the shutter was released (fully depressed) by the operation of the shutter button (not illustrated) in step S905. If not released, processing returns to step S902, and the above mentioned processing is repeated. If it is determined that the shutter is released in step S905, the control unit reads image data from the imaging element 101, and stores the image data in the image storage unit 104. The image generation unit performs development processing on the image data stored in the image storage unit 104, whereby a final image can be generated. Further, an object depth image (object depth distribution) corresponding to the final image can be generated by applying the depth calculation procedure, which will be described later with reference to FIG. 3, to the image data stored in the image storage unit 104.

<Configuration of Imaging Element>

The imaging element 101 is constituted by a CMOS (Complementary Metal-Oxide Semiconductor) or a CCD (Charge-Coupled Device). The object image is formed on the imaging element 101 via the imaging optical system 120, and the imaging element 101 performs photoelectric conversion on the received luminous flux, and generates image data based on the object image. The imaging element 101 according to this embodiment will now be described in detail with reference to FIG. 1B.

FIG. 1B is an xy cross-sectional view of the imaging element 101. The imaging element 101 has a configuration in which a plurality of pixel groups (2 rows×2 columns) is arranged. Each pixel group 150 is constituted by green pixels 150G1 and 150G2, which are disposed in diagonal positions, and a red pixel 150R and a blue pixel 150B, which are the other two pixels.

<Principle of Depth Measurement>

In each pixel constituting the pixel group 150 of this embodiment, two photoelectric conversion units (first photoelectric conversion unit 161, and second photoelectric conversion unit 162), of which shapes are symmetric in the xy cross section, are disposed in the light receiving layer (203 in FIG. 2) in the pixel. The luminous flux received by the first photoelectric conversion unit 161 and the second photoelectric conversion unit 162 in the imaging element 101 will be described with reference to FIG. 2.

FIG. 2 is a schematic diagram depicting only the exit pupil 103 of the imaging optical system 120 and the green pixel 150G1 as an example representing the pixels disposed in the imaging element 101. The pixel 150G1 shown in FIG. 2 is constituted by a color filter 201, a micro lens 202 and a light receiving layer 203, and the first photoelectric conversion unit 161 and the second photoelectric conversion unit 162 are included in the light receiving layer 203. The micro lens 202 is disposed such that the exit pupil 103 and the light receiving layer 203 are in a conjugate relationship. As a result, the luminous flux 210 that has passed through a first pupil area (261) of the exit pupil enters the first photoelectric conversion unit, and the luminous flux 220 that has passed through a second pupil area (262) thereof enters the photoelectric conversion unit 162, as shown in FIG. 2.

The plurality of first photoelectric conversion units 161 disposed in each pixel performs photoelectric conversion on the received luminous flux and generates the first image data. In the same manner, the plurality of second photoelectric conversion units 162 disposed in each pixel performs photoelectric conversion on the received luminous flux and generates the second image data. From the first image data, the intensity distribution of the first image (image A), which the luminous flux that has mainly passed through the first pupil area forms on the imaging element 101, can be acquired. From the second image data, the intensity distribution of the second image (image B), which the luminous flux that has mainly passed through the second pupil area forms on the imaging element 101, can be acquired. Therefore, the relative positional shift amount of the first image and the second image is the positional shift amount of the image A and image B. By calculating this positional shift amount according to a later mentioned method and converting the calculated positional shift amount into the defocus amount using a conversion coefficient, the depth (distance) to the object can be calculated.

<Description on Depth Calculation Procedure>

The depth calculation procedure of this embodiment will now be described with reference to FIG. 3.

In step S1, the imaging element 101 acquires the first image data and the second image data, and transfers the acquired data to the depth calculation unit 102.

In step S2, the light quantity balance correction processing is performed to correct the balance of the light quantity between the first image data and the second image data. To correct the light quantity balance, a known method can be used. For example, a coefficient to correct the light quantity balance between the first image data and the second image data is calculated based on an image acquired by photographing a uniform surface light source in advance using the digital camera 100.

In step S3, the depth calculation unit 102 calculates the positional shift amount based on the first image data and the second image data. The calculation method for the positional shift amount will be described later with reference to FIG. 4A to FIG. 4D and FIG. 6A to FIG. 6F.

In step S4, the depth calculation unit 102 converts the positional shift amount into an image-side defocus amount using a predetermined conversion coefficient. The image-side defocus amount is a distance from an estimated focal position (imaging element surface) to the focal position of the imaging optical system 120.

Figure 5A:
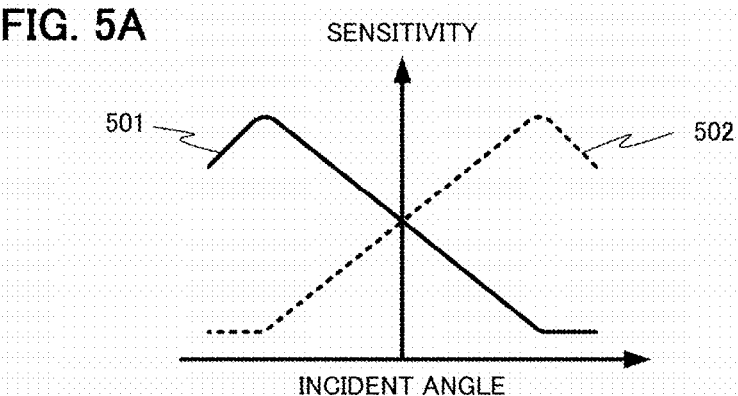
FIG. 5A and FIG. 5B are diagrams depicting a base line length.

The calculation method for the conversion coefficient that is used for converting the positional shift amount into the image side defocus amount will now be described with reference to FIG. 5A and FIG. 5B. FIG. 5A shows a light receiving sensitivity incident angle characteristic of each pixel. The abscissa indicates the incident angle of the light that enters the pixel (angle formed by the ray projected to the xz plane and the z axis), and the ordinate indicates the light receiving sensitivity. The solid line 501 indicates the light receiving sensitivity of the first photoelectric conversion unit, and the broken line 502 indicates the light receiving sensitivity of the second photoelectric conversion unit.

Figure 5B:
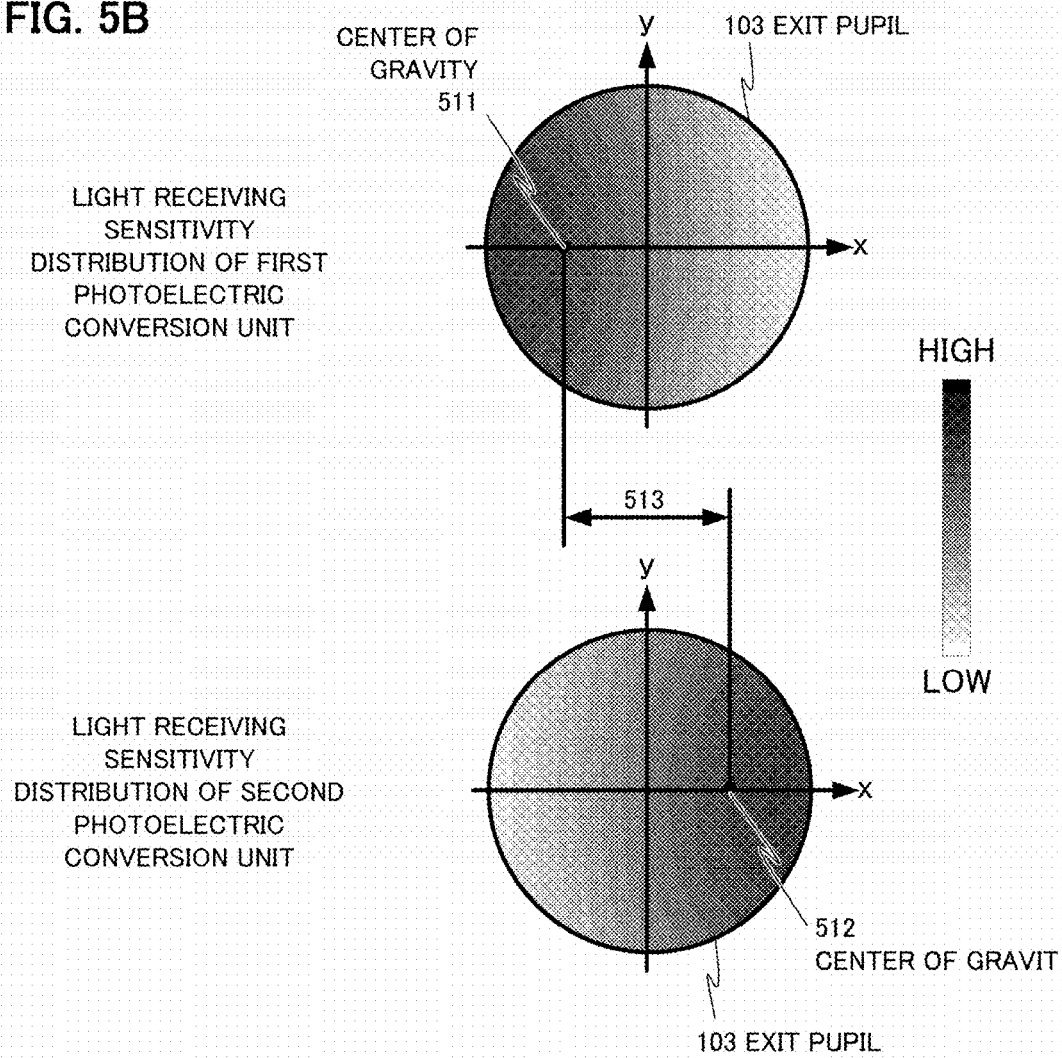

FIG. 5B shows the light receiving sensitivity distribution on the exit pupil 103 when this receiving sensitivity is projected onto the exit pupil 103. The darker the color, the higher the light receiving sensitivity. In FIG. 5B, reference numeral 511 indicates a center of gravity position of the light receiving sensitivity distribution of the first photoelectric conversion unit, and reference numeral 512 indicates a center of gravity position of the light receiving sensitivity distribution of the second photoelectric conversion unit. The distance 513 between the center of gravity position 511 and the center of gravity position 512 is called "base line length", and is used as the conversion coefficient to convert the positional shift amount into the image side defocus amount. When r is the positional shift amount, w is the base line length and L is the pupil distance from the imaging element 101 to the exit pupil 103, the positional shift amount can be converted into the image side defocus amount ΔL using the following Expression 1.

$$\Delta L = \frac{r \cdot L}{w - r} \qquad (1)$$

In this embodiment, the positional shift amount is converted into the image-side defocus amount using Expression 1, but the positional shift amount may be converted into the image side defocus amount by a different method. For example, based on the assumption that the base line length w is sufficiently larger than the positional shift amount r in Expression 1, a gain value Gain may be calculated using Expression 2, and the positional shift amount may be converted into the image side defocus amount based on Expression 3.

$$\text{Gain} = L/w \quad (2)$$

$$\Delta L = \text{Gain} \cdot r \quad (3)$$

By using Expression 3, the positional shift amount can be easily converted into the image side defocus amount, and the computation amount to calculate the object depth can be reduced. A lookup table for conversion may be used to convert the positional shift amount into the image side defocus amount. In this case, as well, the computation amount to calculate the object depth can be reduced.

In FIG. 2, it is assumed that x is positive in the first pupil area, and x is negative in the second pupil area. However, the actual light that reaches the light receiving layer 203 has a certain spread due to the light diffraction phenomenon, and, therefore, the first pupil area and the second pupil area overlap, as shown in the light receiving sensitivity distribution in FIG. 5B. For convenience, however, the first pupil area 261 and the second pupil area 262 are assumed to be clearly separated in the description of this embodiment.

In step S5, the image side defocus amount calculated in step S4 is converted into the object depth based on the image forming relationship of the imaging optical system (object depth calculation processing). Conversion into the object depth may be performed by a different method. For example, the image side defocus amount is converted into the object-side defocus amount, and the sum of the object side defocus amount and the object-side focal position, which is calculated based on the focal length of the imaging optical system 120, is calculated, whereby the depth to the object is calculated. The object-side defocus amount can be calculated using the image-side defocus amount and the longitudinal magnification of the imaging optical system 120.

In the depth calculation procedure of this embodiment, the positional shift amount is converted into the image-side defocus amount in step S4, and then, the image-side defocus amount is converted into the object depth in step S5. However, the processing executed after calculating the positional shift amount may be other than the above mentioned processing. As mentioned above, the image-side defocus amount and the object-side defocus amount, or the image-side defocus amount and the object depth can be converted into each other using the image forming relationship of the imaging optical system 120. Therefore, the positional shift amount may be directly converted into the object-side defocus amount or the object depth, without being converted into the image-side defocus amount. In either case, the defocus amount (image-side and/or object-side) and the object depth can be accurately calculated by accurately calculating the positional shift amount.

In this embodiment, the image-side defocus amount is converted into the object depth in step S5, but step S5 need not always be executed, and the depth calculation procedure may be completed in step S4. In other words, the image-side defocus amount may be the final output. The blur amount of the object in the final image depends on the image-side defocus amount, and, as the image-side defocus amount of the object becomes greater, a more blurred image is photographed. To perform refocusing processing for adjusting the focal position in the image processing in a subsequent step, it is sufficient if the image-side defocus amount is known, and conversion into the object depth is unnecessary. As mentioned above, the image-side defocus amount can be converted into/from the object side defocus amount or the positional shift amount. Hence, the final output may be the object-side defocus amount or the positional shift amount.

<Factor for Generating Positional Shift Amount Error>

Figure 4A:
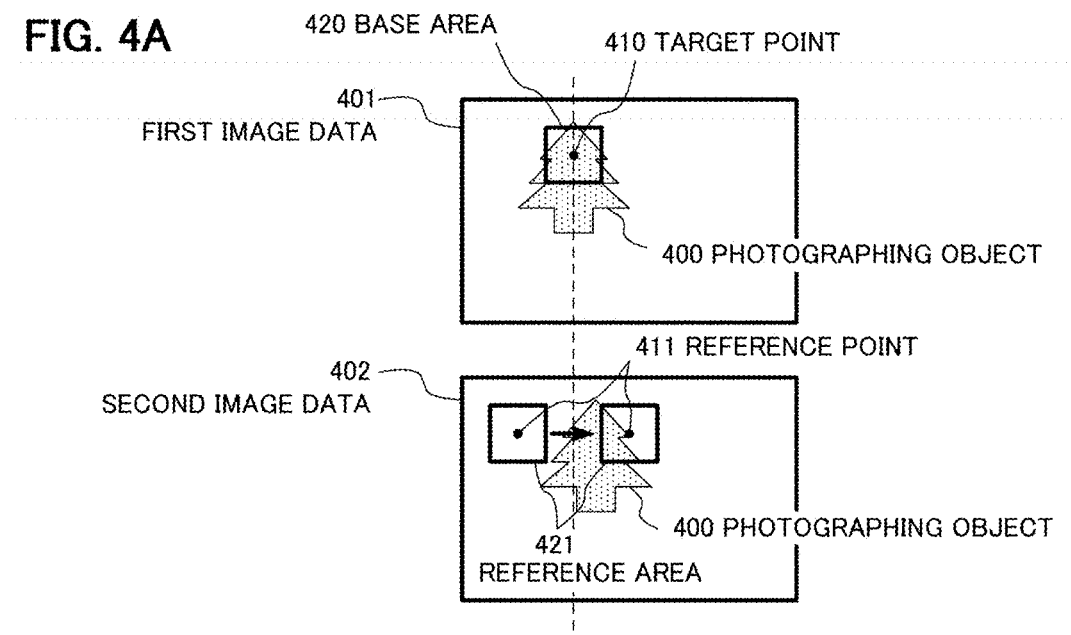
FIG. 4A to FIG. 4D are diagrams depicting a positional shift amount calculation method and a factor that generates a positional shift amount error.

A calculation method for the positional shift amount will be described first with reference to FIG. 4A to FIG. 4D. FIG. 4A is a diagram depicting the calculation method for the positional shift amount, where the first image data 401, second image data 402, and photographing object 400 are shown. A target point 410 is set for the first image data 401, and a base area 420 is set centering around the target point 410. For the second image data 402, on the other hand, a reference point 411 is set at a position corresponding to the target point 410, and the reference area 421 is set centering around the reference point 411. The sizes of the base area 420 and the reference are 421 are the same. While the reference point 411 is sequentially moved within a predetermined positional shift amount searching range, a correlation value between the first image data in the base area 420 and the second image data in the reference area 421 is calculated, and the reference point 411, at which the highest correlation value is acquired, is regarded as being a corresponding point of the target point 410. The positional shift amount searching range is determined based on the maximum depth and the minimum depth to calculate. For example, the maximum depth is set to infinity, and the minimum depth is set to the minimum photographing depth of the imaging optical system 120, and the range of the maximum positional shift amount and the minimum positional shift amount, which are determined by the maximum depth and the minimum depth respectively, is set as the positional shift amount searching range. The positional shift amount is a relative positional shift amount between the target point 410 and the corresponding point. By searching for the corresponding point while sequentially moving the target point 410, the positional shift amount at each data position (each pixel position) in the first image data can be calculated. To calculate the correlation value, a known method can be used, such as the SSD method, where a square-sum of the difference between each pixel data (each pixel value) in the base area 420 and each pixel data in the reference area 421 is used as an evaluation value.

Figure 4B:
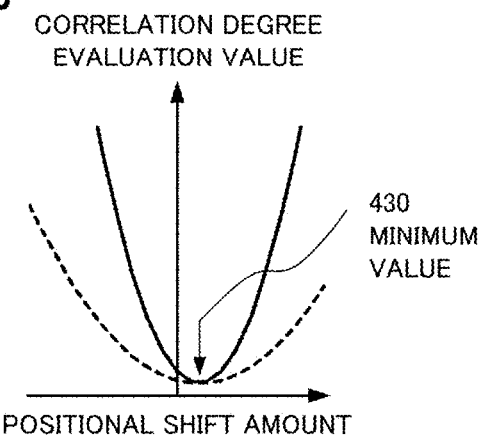

Now, a factor that generates the positional shift amount error will be described. In FIG. 4B, the abscissa indicates the positional shift amount, and the ordinate indicates the correlation degree evaluation value based on SSD. A curve that indicates the correlation degree evaluation value for each positional shift amount is hereafter called a "correlation value curve". The solid line in FIG. 4B indicates the correlation value curve when the contrast of the object image is high, and the broken line indicates the correlation value curve when the contrast of the object image is low. The correlation value curve has a minimum value 430. The positional shift amount, where the correlation degree evaluation value is the minimum value, is determined as the positional shift amount of which correlation is highest, that is, is determined as the positional shift amount. As the correlation value curve changes more sharply, the influence of noise decreases. Therefore, a calculation error of the positional shift amount decreases. Hence, if the contrast of the object image is high, the positional shift amount can be accurately calculated. If the contrast of the object image is low, on the other hand, the change of the correlation value curve becomes gentle. Hence, a calculation error of the positional shift amount increases.

Figure 4C:
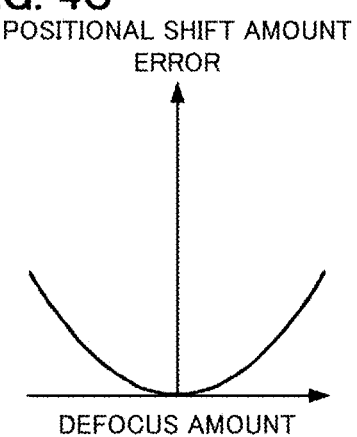

Contrast does not deteriorate very much in an area near the focal position of the imaging optical system 120. Hence, a high contrast object image can be acquired near the focal position. As the position of the object moves away from the focal position of the imaging optical system 120 (as the object is defocused), the contrast drops, and the contrast of the acquired image also decreases. If the defocus amount is plotted on the abscissa and the positional shift amount error is plotted on the ordinate, as shown in FIG. 4C, the positional shift amount error increases as the defocus amount increases.

Figure 4D:
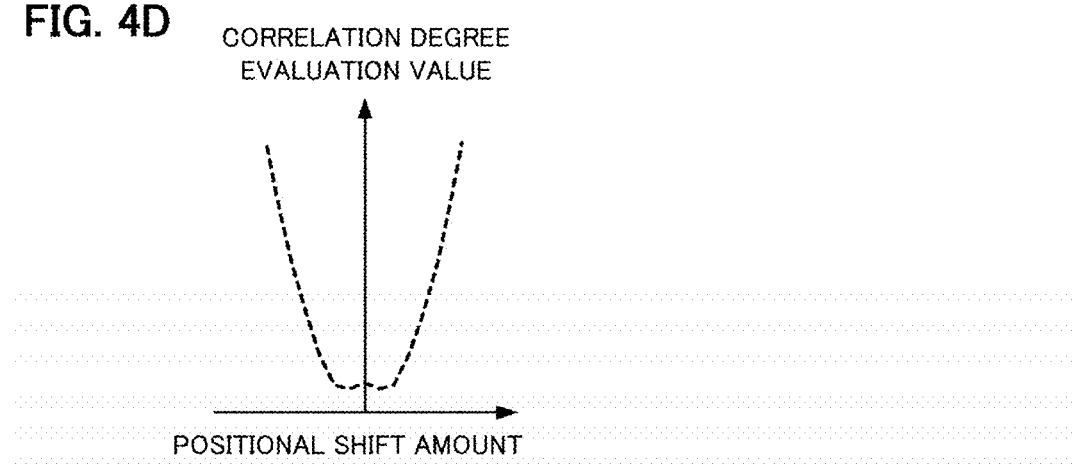

If the positional shift amount changes within the base area, a bimodal correlation value curve, having two minimum values, is acquired, as shown in FIG. 4D. In this case, the positional shift amount is calculated based on the smaller of the two minimum values, which means that the positional shift amount may be miscalculated.

<Detailed Description on Positional Shift Amount Calculation Method>

The depth calculation unit 102 of this embodiment and the positional shift amount calculation procedure S3 will now be described in detail with reference to FIG. 6A to FIG. 6C. FIG. 6A is a diagram depicting a detailed configuration of the depth calculation unit 102, and FIG. 6B is a flow chart depicting the positional shift amount calculation procedure.

The depth calculation unit 102 is constituted by a positional shift amount calculation unit 602, a base area setting unit 603, and a depth conversion unit 604. The positional shift amount calculation unit 602 calculates the positional shift amount of the first image data and the second image data stored in the image storage unit 104 using a base area having a predetermined size, or a base area having a size set by the base area setting unit 603. The base area setting unit 603 receives the positional shift amount (first positional shift amount) from the positional shift amount calculation unit 602, and outputs the size of the base area corresponding to this positional shift amount to the positional shift amount calculation unit 602. The first image data and the second image data, on which light quantity balance correction has been performed, as described with reference to step S2 in FIG. 3, are stored in the image storage unit 104.

In step S3-1 in FIG. 6B, the positional shift amount calculation unit 602 calculates the first positional shift amount based on the first image data and the second image data acquired from the image storage unit 104. In concrete terms, the first positional shift amount is calculated by the corresponding point search method described with reference to FIG. 4A to FIG. 4D, using the base area (first base area) having a size that is set in advance (first size).

In step S3-2 in FIG. 6B, the base area setting unit 603 sets a size of the second base area (second size) based on the first positional shift amount. According to this embodiment, a second base area, of which area size is greater than the first base area, is set when the absolute value of the first positional shift amount acquired by the positional shift amount calculation unit 602 exceeds a predetermined threshold. FIG. 6C shows the relationship between the absolute value of the first positional shift amount and the size of the second base area.

In FIG. 6C, the abscissa indicates the absolute value of the first positional shift amount, and the ordinate indicates the size of the second base area. The broken line 620 parallel with the abscissa indicates the area size of the first base area (first size). If the absolute value of the first positional shift amount is greater than the threshold 610, the size of the second base area (second size) becomes larger than the area size of the first base area (first size).

In step S3-3 in FIG. 6B, the positional shift amount calculation unit 602 searches for a corresponding point again using the second base area, and calculates the second positional shift amount. According to this embodiment, if the absolute value of the first positional shift amount is a predetermined threshold or less, the positional shift amount calculation unit 602 does not recalculate the positional shift amount, and regards the first positional shift amount as the second positional shift amount.

By the above processing, the positional shift amount calculation procedure S3 completes. Then, the depth conversion unit 604 converts the second positional shift amount into the object depth by the method described in step S4 and S5 in FIG. 3, and outputs the object depth information.

<Reason why Changes of Positional Shift Amount and Influence of Noise can be Reduced>

The reason why changes of the positional shift amount in the base area and influence of noise generated upon acquiring image signals can be reduced by the depth calculation method executed by the depth calculation unit 102 of this embodiment will be described with reference to FIG. 7A to FIG. 7D.

Figure 7A:
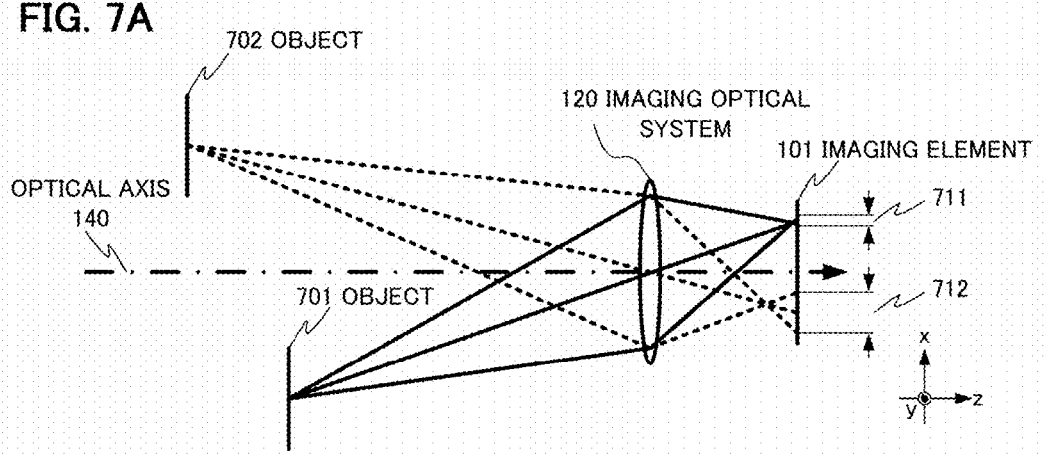
FIG. 7A to FIG. 7D are diagrams depicting the reason why the positional shift amount can be accurately calculated in the first embodiment.
Figure 7B:
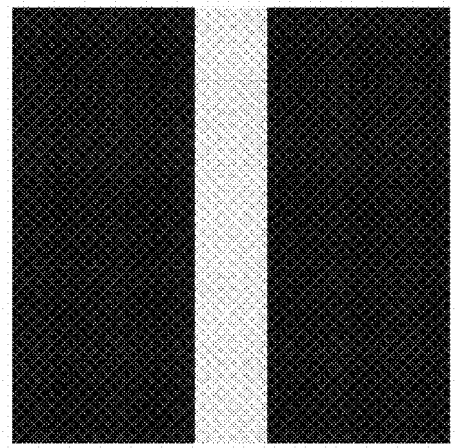
Figure 7C:
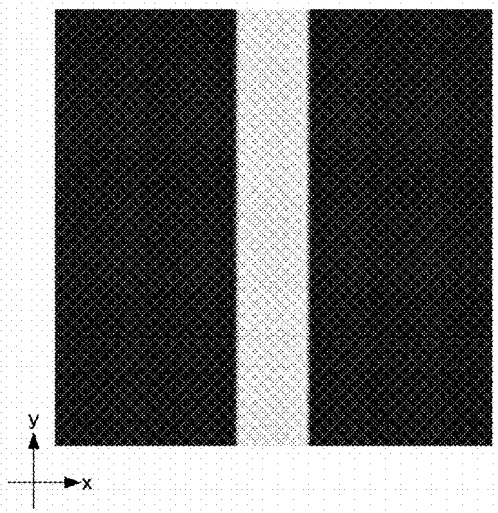
Figure 7D:
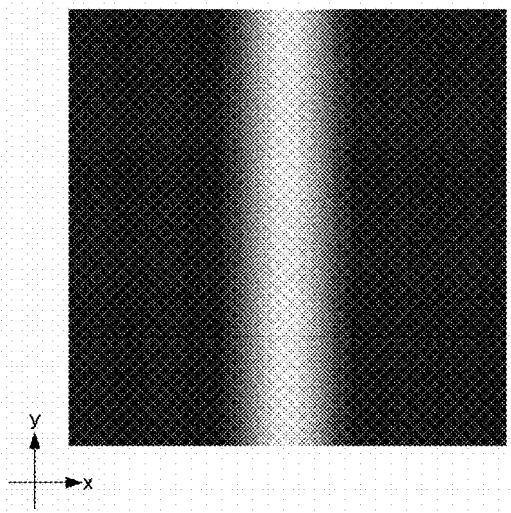

FIG. 7A is a diagram depicting acquisition of the images of an object 701 and an object 702 in the digital camera 100. Here, the object 701 is disposed in a focal position of the imaging optical system 120, and the blur size 711 on the imaging element 101 is small. The object 702, on the other hand, is disposed in a position distant from the focal position of the imaging optical system 120, and the blur size 712 on the imaging element 101 is larger. If the object 701 and the object 702 have a brightness distribution shown in FIG. 7B, then, the image of the object 701 becomes like that shown in FIG. 7C (with little blur), and the image of the object 702 becomes like that shown in FIG. 7D (with considerable blur).

If the defocus amount is large, as in the case of the object 702 (FIG. 7D), the acquired image is considerably blurred. Hence, the positional shift amount gently changes. Further, the acquired object image has a low contrast. Therefore, in order to reduce an error of the positional shift amount, it is preferable to set a large base area. If the defocus amount is small, as in the case of the object 701 (FIG. 7C), the acquired image is not blurred very much. Hence, the positional shift amount may sharply change. Further, the acquired object image has high a contrast. Therefore, in order to reduce an error in the positional shift amount, it is preferable to set a small base area.

If the absolute value of the first positional shift amount is large (that is, if the defocus amount is large), the depth calculation unit 102 of this embodiment sets a large base area (second base area), and calculates the positional shift amount again. In other words, if the contrast of the image acquired via the imaging optical system 120 is low, and the changes of the positional shift amount are gentle, a large base area is set.

If the absolute value of the first positional shift amount is greater than a predetermined threshold, the depth calculation unit 102 of this embodiment sets a larger second base area. This makes it unnecessary to calculate the positional shift amount of spatially adjacent pixels, and both reducing the influence of the changes of positional shift amount and the influence of noise generated upon acquiring image signals can be implemented by a simple operation. Furthermore, the base area is set according to the optical characteristic of the imaging optical system 120. Hence, dependency of the object depth on the changes of the positional shift amount can be reduced, and the object depth can be accurately measured.

The depth calculation unit 102 of this embodiment sets a larger size for the second base area when the absolute value of the first positional shift amount is greater than a predetermined threshold 610, as shown in FIG. 6C, but the size of the second base area may be determined by a different method. For example, as shown in FIG. 6D, the size of the second base area may be determined using a linear function of the absolute value of the first positional shift amount. Or, as a more standard approach, the size of the second base area may be determined, not based on the absolute value of the first positional shift amount, but based on the first positional shift amount itself. Furthermore, considering the case when the object is closer to the digital camera 100 than the focal position, and the case when the object is more distant from the digital camera 100 than the focal position, the inclination in the graph may be changed depending on whether the first positional shift amount is 0 or more (solid line 630) or the first positional shift amount is smaller than 0 (broken line 640), as shown in FIG. 6E. As the relationship between the defocus amount and the error of the positional shift amount is shown in FIG. 4C, the error of the positional shift amount quadratically increases as the defocus amount increases. Therefore, only when the absolute value of the first positional shift amount exceeds the threshold 650, the second area size may be set as an increasing function so that the error of the defocus amount is confined within a predetermined target value, as shown in FIG. 6E. In any case, the changes of the positional shift amount in the base area and the influence of the noise generated upon acquiring image signals can be reduced by setting the size of the second base area considering the optical characteristic of the imaging optical system 120.

The depth calculation unit 102 of this embodiment need not calculate the first positional shift amount by setting the target point 410 for all of the pixel positions in the first image data. The depth calculation unit 102 may calculate the first positional shift amount by sequentially moving the target point 410 by a predetermined space. For example, the first positional shift amount is calculated by keeping ten pixels of space in the horizontal direction and vertical direction, and two-dimensional distribution of the first positional shift amount is expanded by a known expansion method (e.g., bilinear interpolation, nearest neighbor interpolation), and is referred to in order to set the second base area. By decreasing a number of target points that are set for calculating the first positional shift amount, a computation amount required for calculating the first positional shift amount can be reduced.

In the present embodiment, the changes of the positional shift amount in the base area and the influence of noise generated upon acquiring the image signals are reduced by setting the size of the second base area considering the optical characteristic of the imaging optical system 120. Therefore, it is only required that the ratio of the surface area, included in the base area in the first image data, can be changed to set the size of the base area. If the size of the base area is enlarged to increase the number of pixels included in the base area, the influence of the noise generated upon acquiring the image signals can be reduced. Further, the influence of the noise generated upon acquiring the image signals can also be suppressed by reducing (thinning out) the image data while keeping the number of pixels included in the base area constant. The influence of the noise generated upon acquiring the image signals can be reduced either by increasing a number of pixels included in the base area, or by reducing the image data while keeping the number of pixels included in the base area constant.

Figure 11:
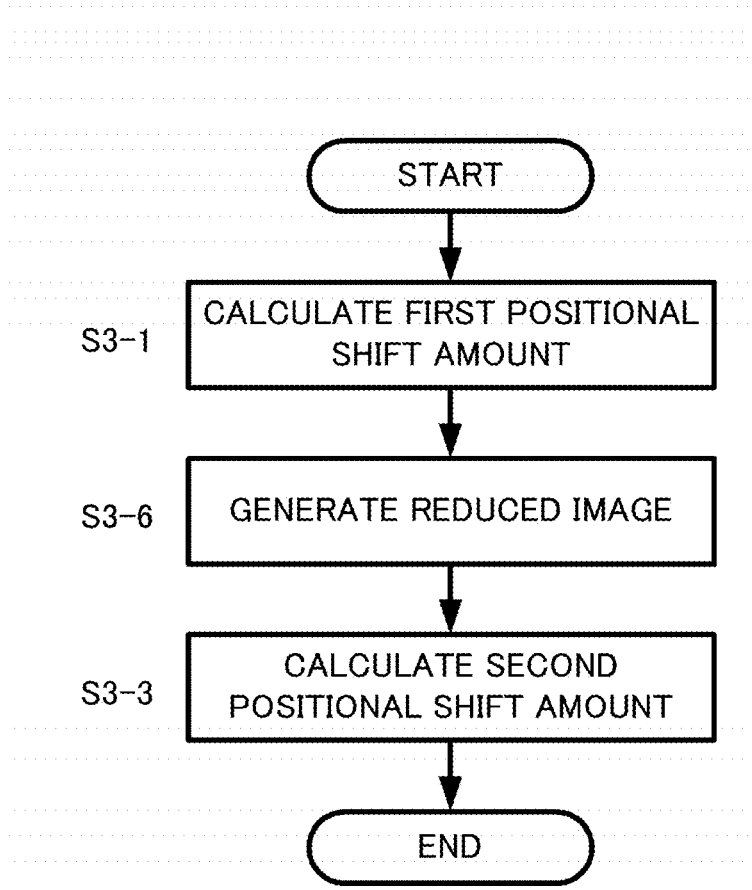
FIG. 11 is a flow chart depicting an example of the positional shift amount calculation procedure according to the first embodiment.

In the case of reducing the image data while keeping the number of pixels included in the base area constant, the positional shift amount calculation unit 602 shown in FIG. 6A uses the positional shift amount calculation procedure shown in FIG. 11. In step S3-6, the sizes of the first image and the second image are changed using a reduction ratio in accordance with the size of the second base area. For example, if the size of the second base area is double the size of the first base area (double in the horizontal direction and vertical direction respectively, four times in terms of area), 0.5 is set as the reduction ratio (0.5 times in the horizontal and vertical directions respectively, ¼ times in terms of number of pixels). To change the size of the image, a known method, such as the bilinear method, can be used. In step S3-3, by using the first image (first reduced image) and the second image (second reduced image) after the size change, the second positional shift amount is calculated based on the second base area, of which number of pixels included in the base area is the same as the first base area. In FIG. 11, the reduction ratio is set in accordance with the size of the second base area, but the base area setting unit 603 may output the reduction ratio of the image to the positional shift amount calculation unit 602 in accordance with the positional shift amount (first positional shift amount) received from the positional shift amount calculation unit 602.

To calculate the second positional shift amount, both the size of the base area and the size of the image data may be changed. In other words, the processing executed by the base area setting unit 603 may not be limited to a specific manner only as long as the relative sizes of the base areas to the first image data and the second image data are changed. The influence of noise can be reduced if the relative sizes of the base areas to the first and second image data upon calculating the second positional shift amount are larger than the relative sizes upon calculating the first positional shift amount.

<Modification 1 of Depth Calculation Unit>

Figure 8A:
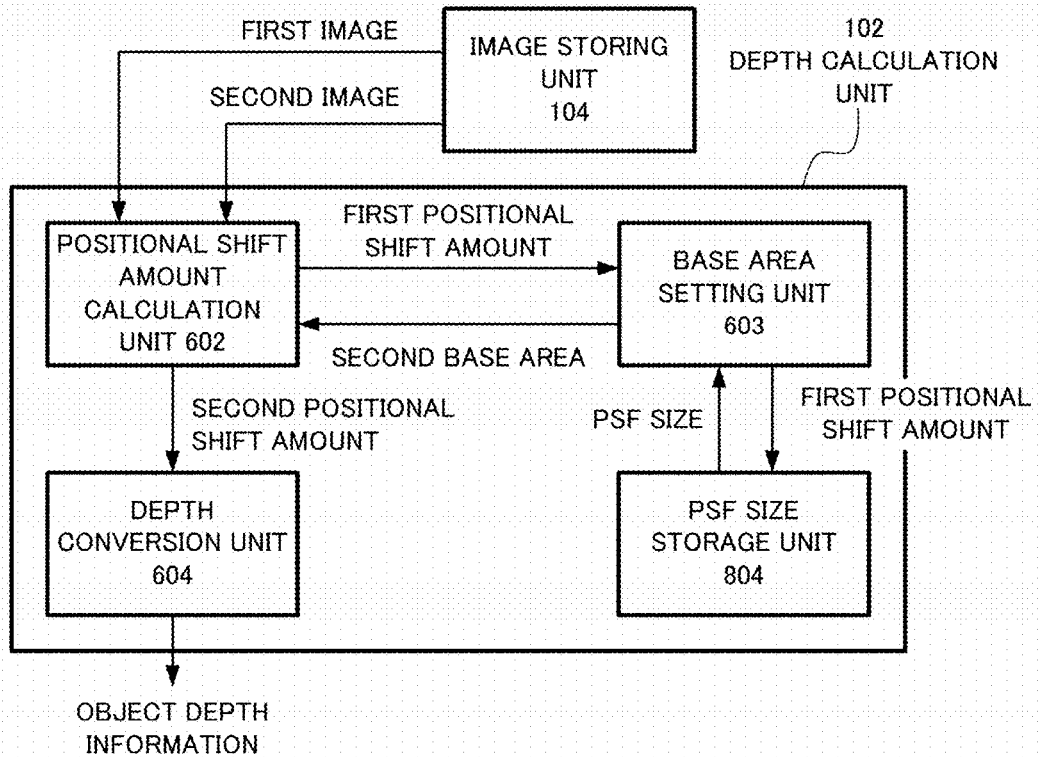
FIG. 8A and FIG. 8B are diagrams depicting the depth calculation unit according to a modification.

The configuration shown in FIG. 8A may be used as a modification of the depth calculation unit 102 of this embodiment. The depth calculation unit 102 in FIG. 8A includes a Point Spread Function (PSF) size storage unit 804 in addition to the above mentioned configuration. In the PSF size storage unit 804, a size of a point spread function of the imaging optical system 120 is stored, so as to correspond to the first positional shift amount.

The general flow of the depth calculation procedure of this modification is the same as above, but, in the step of setting the size of the second base area in step S3-2 in FIG. 6B, the size of the second base area is set based on the PSF size outputted from the PSF size storage unit 804. In concrete terms, the base area setting unit 603 acquires the first positional shift amount from the positional shift amount calculation unit 602. Then, the base area setting unit 603 acquires the PSF size corresponding to the first positional shift amount from the PSF size storage unit 804. The base area setting unit 603 sets the size of the second base area in accordance with the PSF size acquired from the PSF size storage unit 804.

In the depth calculation unit 102 shown in FIG. 8A, the area size of the second base area can be more appropriately set by setting the size of the second base area in accordance with the PSF size based on the defocus of the imaging optical system 120. As a result, the area size of the second base area is not set too large (or too small), and an increase of computation amount and positional shift amount error can be prevented.

The blur size of the imaging optical system 120 can be expressed by 3σ (three times the standard deviation σ) of PSF, for example. Therefore, the PSF size storage unit 804 outputs 3σ of PSF of the imaging optical system 120 as the size of PSF. It is sufficient if the PSF size storage unit 804 stores the PSF size only for the central angle of view, but it is preferable to store the PSF size of the peripheral angle of view as well if the aberration of the imaging optical system 120 at the peripheral angle of view is large. The PSF size may be expressed as a function representing the relationship of the PSF size and the positional shift amount, so that the coefficients are stored in the PSF storage unit 804. For example, the PSF size may be calculated using a linear function in which a reciprocal number of the diaphragm value (F value) of the imaging optical system is a coefficient, as shown in Expression 4, and the coefficients k1 and k2 may be stored in the PSF size storage unit 804.

$$PSFsize = \frac{k1}{F} \times |r| + k2 \quad (4)$$

Here PSFsize is a PSF size, r is a first positional shift amount, F is an F value of the imaging optical system 120, and k1 and k2 are predetermined coefficients.

The PSF size may be determined as shown in Expression 5, considering that the ratio of the base line length (distance 513) described with reference to FIG. 5B and the diameter of the exit pupil 103 of the imaging optical system 120 are approximately the same as the ratio of the absolute value of the first positional shift amount and the PSF size.

$$PSFsize = \frac{k1 \times D}{w} \times |r| + k2 \quad (5)$$

Here, w is a base line length, D is a diameter of the exit pupil, and k1 and k2 are predetermined coefficients. The size of PSF and the defocus amount have an approximate proportional relationship. If it is considered that the defocus amount and the positional shift amount have an approximate proportional relationship, as shown in Expression 3, the coefficient k2 in Expression 4 and Expression 5 is not essentially required.

Figure 8B:
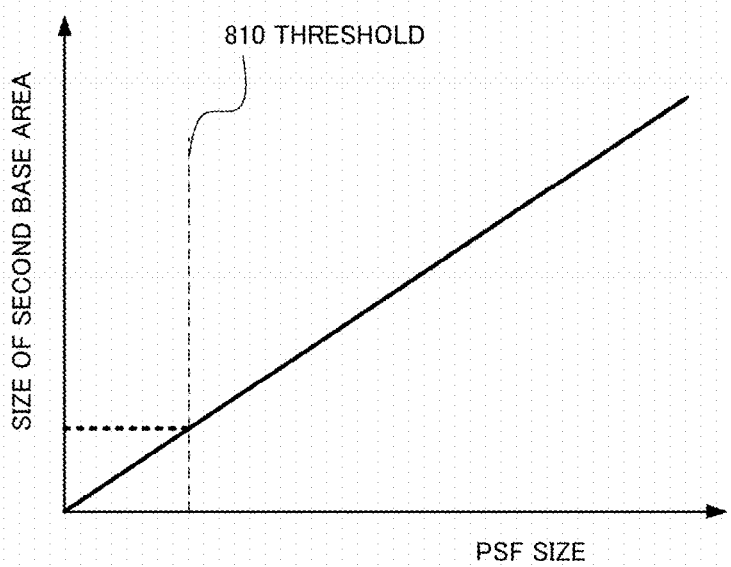

The base area setting unit 603 according to this modification sets the size of the second base area in accordance with the PSF size acquired from the PSF size storage unit 804. FIG. 8B is a graph of which abscissa indicates the PSF size, and the ordinate indicates the size of the second base area. As the solid line in FIG. 8B indicates, the size of the second base area in accordance with the blur of the acquired image can be set by setting the second base area and the PSF size to have a proportional relationship. Further, the PSF size and the size of the second base area may be set to have a proportional relationship if the PSF size exceeds the threshold 810, and may be set such that the size of the second base area becomes constant if the PSF size is less than the threshold 810 as the broken line in FIG. 8B indicates.

In either case, the second base area is more appropriately set by setting the second base area in accordance with the change of the PSF size due to the defocus of the imaging optical system 120. Thereby, the area size of the second base area is not set too large (or too small), and an increase of computation amount and positional shift amount error can be prevented.

<Modification 2 of Depth Calculation Unit>

Figure 8C:
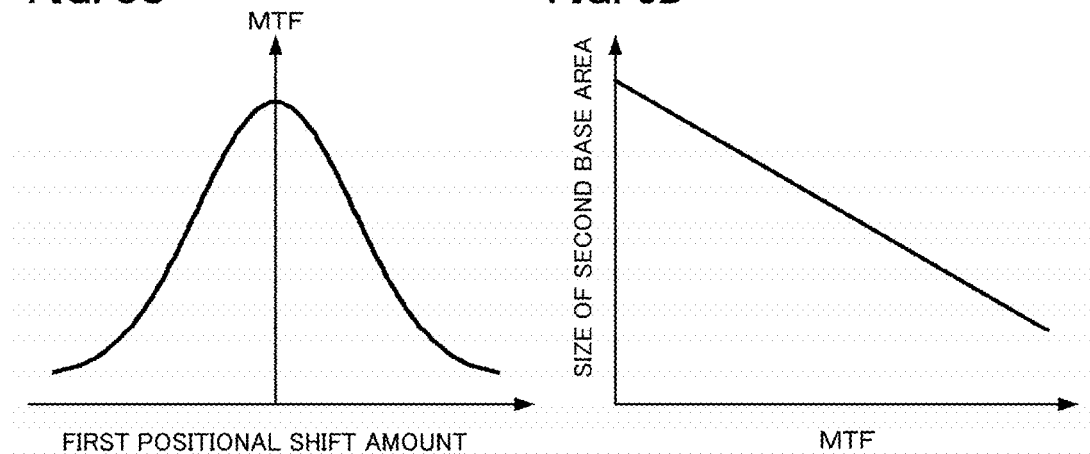
FIG. 8C to FIG. 8E are diagrams depicting the depth calculation unit according to a modification.
Figure 8D:
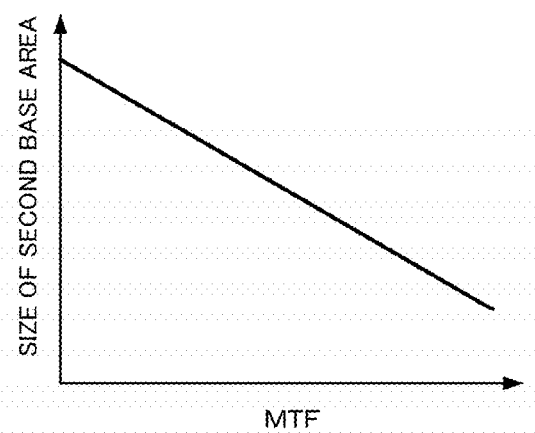

As another modification of this embodiment, the depth calculation unit 102 may include an imaging performance value storage unit instead of the PSF size storage unit 804. From the imaging performance value storage unit, a value representing the imaging performance of the object image formed by the imaging optical system 120 is outputted. The imaging performance can be expressed, for example, by an absolute value of the optical transfer function (that is, a modulation transfer function, and hereafter called "MTF"), which indicates the imaging performance of the imaging optical system 120. In FIG. 8C, the abscissa indicates the first positional shift amount, and the ordinate indicates the MTF of the imaging optical system 120 at a predetermined spatial frequency. As the absolute value of the first positional shift amount is smaller, the defocus amount is smaller, and a higher MTF can be acquired. The base area setting unit 603 may acquire the MTF corresponding to the first positional shift amount from the imaging performance value storage unit, as shown in FIG. 8D, and set a smaller second base area as the MTF is higher. As the MTF of the imaging optical system 120 is higher, contrast of the object image deteriorates less, and a clearer image can be acquired. Therefore, the base area, considering the optical characteristic of the imaging optical system 120, can be set by setting the second base area based on the MTF corresponding to the first positional shift amount. Thereby, the second base area is not set too large (or too small), and an increase of the computation amount and positional shift amount error can be prevented. The information stored in the PSF size storage unit 804 need not be information that indicates the size of the PSF, information that indicates the MTF, or information that indicates the optical characteristic of the imaging optical system 120, as shown in modification 1 and modification 2 of this embodiment. Required is information indicating that the optical characteristic of the imaging optical system 120 is stored. By setting the second base area in accordance with the blur size of the imaging optical system 120, using the information that indicates the optical characteristic of the imaging optical system 120 and the first positional shift amount, an increase of the computation amount and positional shift amount error can be prevented, and the depth to the object can be calculated at high accuracy.

<Modification 3 of Depth Calculation Unit>

Figure 8E:
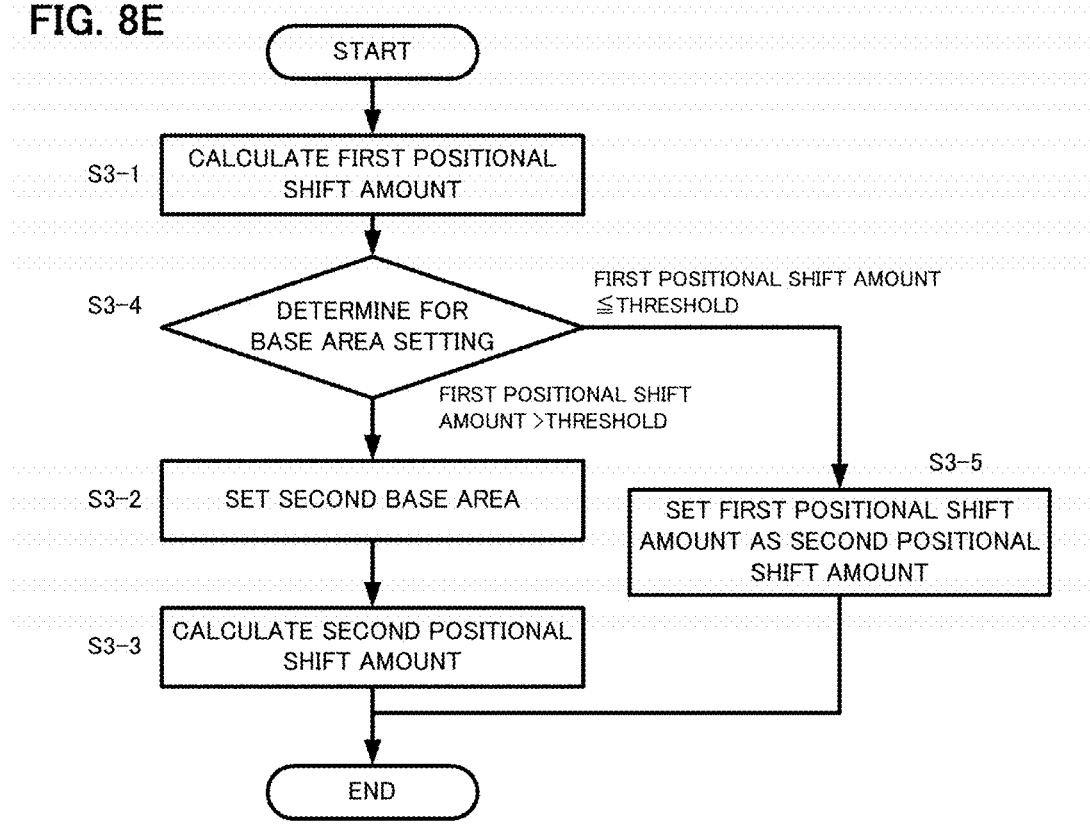

As another modification of this embodiment, the procedure shown in FIG. 8E may be used. In the following description, it is assumed that the depth calculation unit 102 includes a base area setting determination unit in addition to the configuration shown in FIG. 6A.

In FIG. 8E, a base area setting determination step in step S3-4 and a step of setting the first positional shift amount as the second positional shift amount in step S3-5 are added to the procedure in FIG. 6B. In step S3-4, determination processing is executed, in which processing advances to step S3-2 if the absolute value of the first positional shift amount is greater than a predetermined threshold, or otherwise, advances to step S3-5. In step S3-5, processing to set the first positional shift amount as the second positional shift amount is executed.

In the procedure shown in FIG. 8E, only when the contrast of the image drops because the defocus amount is large, the second base area is set based on the first positional shift amount. Then, the second positional shift amount is calculated. If the defocus amount is small, the first positional shift amount is set as the second positional shift amount. By following this procedure, a number of pixels for which the positional shift amount is calculated twice is decreased. Thereby, the computation amount can be further decreased while reducing the positional shift amount error.

In the above description, it is assumed that the depth calculation unit 102 includes the base area setting determination unit in addition to the configuration shown in FIG. 6A, but may include the base area setting determination unit in addition to the configuration shown in FIG. 8A. In this case, as well, a number of pixels for which the positional shift amount is calculated twice is decreased, and the computation amount can be further decreased.

<Other Examples of First Image Data and Second Image Data Acquisition Method>

Figure 10:
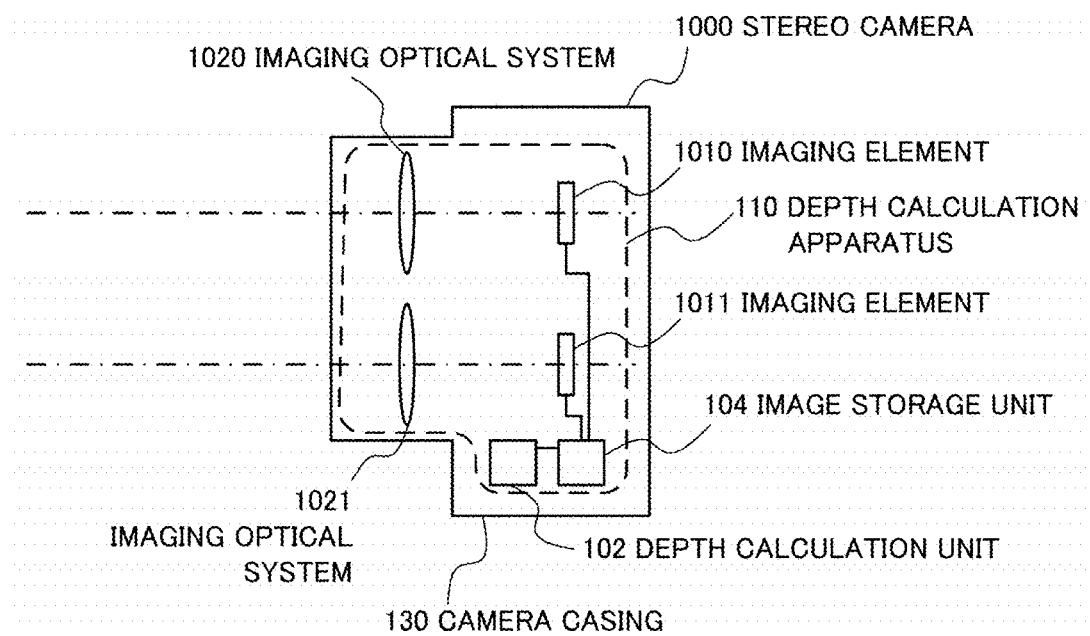
FIG. 10 is a diagram depicting a configuration of the digital camera according to the modification.

In the first embodiment, two image data having different points of view are acquired by splitting the luminous flux of one imaging optical system, but two image data may be acquired using two imaging optical systems. For example, the stereo camera 1000 shown in FIG. 10 may be used. In the stereo camera 1000, two imaging optical systems 1020 and 1021, two imaging elements 1010 and 1011, a depth calculation unit 102, an image storage unit 104, an image generation unit (not illustrated), and a lens driving control unit (not illustrated) are disposed inside a camera casing 130. The imaging optical systems 1020 and 1021, the imaging elements 1010 and 1011, the depth calculation unit 102 and the image storage unit 104 constitute a depth calculation apparatus 110.

In the case of the stereo camera, it is assumed that the image data generated by the imaging element 1010 is the first image data, and the image data generated by the imaging element 1011 is the second image data. The optical characteristic of the imaging optical system 1020 and that of the imaging optical system 1021 are preferably similar. The depth calculation unit 102 can calculate the depth to the object according to the depth calculation procedure described with reference to FIG. 3. The base line length in the case of the stereo camera 1000 can be the depth between the center position of the exit pupil of the imaging optical system 1020 and the center position of the exit pupil of the imaging optical system 1021. To convert the second positional shift amount, which is calculated according to the positional shift amount calculation procedure described with reference to FIG. 6B, into the depth to the object, a known method can be used.

In this modification, as well, the changes of the positional shift amount in the base area and the influence of noise generated upon acquiring images can be reduced by setting the size of the second base area considering the optical characteristic of the imaging optical systems 1020 and 1021. Particularly, in the case of the stereo camera 1000, the F values of the imaging optical systems 1020 and 1021 must be small in order to acquire high resolution images. In this case, a drop in contrast due to defocus becomes conspicuous. Hence, the depth calculation apparatus that includes the depth calculation unit 102 according to this embodiment can ideally calculate the depth to the object.

The above mentioned depth calculation apparatus according to the first embodiment can be installed by software (programs) or hardware. For example, a computer program is stored in memory of a computer (e.g. a microcomputer, a CPU, an MPU, an FPGA) included in the imaging apparatus or image processing apparatuses, and the computer executes the program to implement each processing. It is also preferable to dispose a dedicated processor, such as an ASIC, to implement all or a portion of the processing of the present invention using logic circuits. The present invention is also applicable to a server in a cloud environment.

The present invention may be implemented by a method constituted by steps to be executed by a computer of a system or an apparatus, which implements the above mentioned functions of the embodiment by reading and executing a program recorded in a storage apparatus. For this purpose, this program is provided to the computer via a network, or via various types of recording media that can function as a storage apparatus (that is, a computer readable recording media that holds data non-temporarily), for example. Therefore, this computer (including such a device as a CPU and an MPU), this method, this program (including program codes and program products), and the computer readable recording media that non-temporarily stores this program are all included within the scope of the present invention.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A positional shift amount calculation apparatus that calculates a positional shift amount, which is a relative positional shift amount between a first image based on a luminous flux that has passed through a first imaging optical system, and a second image, the apparatus comprising:
   at least one processor operatively coupled to a memory to functions as:
   (a) a calculation unit adapted to calculate a positional shift amount based on data within a predetermined area out of first image data representing a first image and second image data representing a second image; and
   (b) a setting unit adapted to set a relative size of the area to the first and second image data, wherein (i) the calculation unit is adapted to calculate a first positional shift amount using the first image data and the second image data in the area having a first size that is preset, (ii) the setting unit is adapted to set a second size of the area based on the size of the first positional shift amount and an optical characteristic of the first imaging optical system, and (iii) the calculation unit is adapted to calculate a second positional shift amount using the first image data and the second image data in the area having the second size, and wherein, when an absolute value of the first positional shift amount is greater than a predetermined threshold, the setting unit sets the second size to be larger as the absolute value of the first positional shift amount is greater.

2. The positional shift amount calculation apparatus according to claim 1, wherein the setting unit sets the second size by changing sizes of the first and second images.

3. An imaging apparatus comprising:
an imaging optical system;
an imaging element adapted to acquire image data based on a luminous flux that has passed through the imaging optical system; and
the positional shift amount calculation apparatus according to claim 1.

4. The positional shift amount calculation apparatus according to claim 1, wherein, when the absolute value of the first positional shift amount is greater than the predetermined threshold, the setting unit sets the second size and the calculation unit calculates the second positional shift amount, and, when the absolute value of the first positional shift amount is the predetermined threshold or less, the first positional shift amount is set as the second positional shift amount.

5. The positional shift amount calculation apparatus according to claim 1, wherein the optical characteristic of the first imaging optical system includes one of a diaphragm value of the first imaging optical system, a size of a point spread function of the first imaging optical system, and an imaging performance of the first imaging optical system.

6. The positional shift amount calculation apparatus according to claim 1, wherein the first image is an image based on a luminous flux that has passed through a first pupil area in an exit pupil of the first imaging optical system, and the second image is an image based on a luminous flux that has passed through a second pupil area, which is different from the first pupil area, in the exit pupil of the first imaging optical system.

7. The positional shift amount calculation apparatus according to claim 1, wherein the first image is an image based on the luminous flux that has passed through the first imaging optical system, and the second image is an image based on a luminous flux that has passed through a second imaging optical system that is different from the first imaging optical system.

8. The positional shift amount calculation apparatus according to claim 6, further comprising a storage unit in which a point spread function (PSF) size of the first imaging optical system, is stored,
wherein the setting unit acquires the PSF size corresponding to the first positional shift amount from the storage unit, and sets the second size based on the acquired PSF size.

9. The positional shift amount calculation apparatus according to claim 8, wherein the PSF size is given by the following expression, where r is the first positional shift amount, F is a diaphragm value of the first imaging optical system, and k1 and k2 are predetermined coefficients:

$$PSFsize = \frac{k1}{F} \times |r| + k2.$$

10. The positional shift amount calculation apparatus according to claim 8, wherein the PSF size is three times a standard deviation of the point spread function corresponding to the first positional shift amount.

11. The positional shift amount calculation apparatus according to claim 6, further comprising a storage unit in which a point spread function PSF size of the first imaging optical system, is stored,
wherein the setting unit acquires the PSF size corresponding to the first positional shift amount from the storage unit, and sets the second size based on the acquired PSF size, and
the PSF size is given by the following expression, where r is the first positional shift amount, w is a depth between a center of gravity position of the first pupil area and a center of gravity position of the second pupil area, D is a diameter of the exit pupil of the imaging optical system, and k1 and k2 are predetermined coefficients:

$$SFsize = \frac{k1 \times D}{w} \times |r| + k2.$$

12. The positional shift amount calculation apparatus according to claim 6, further comprising a storage unit, in which an evaluation value representing imaging performance of the first imaging optical system is stored,
wherein the setting unit acquires the evaluation value corresponding to the first positional shift amount from the storage unit, and sets the second size based on the acquired evaluation value.

13. The positional shift amount calculation apparatus according to claim 12, wherein the evaluation value indicates an optical transfer function of the first imaging optical system at a predetermined spatial frequency.

14. The positional shift amount calculation apparatus according claim 1, further comprising a depth conversion unit adapted to convert the second positional shift amount, calculated by the calculation unit, into a defocus amount that is a depth from an estimated focal position to a focal position of an imaging optical system, based on a predetermined conversion coefficient.

15. A non-transitory computer-readable storage medium storing a computer program, when run by a computer, causes the computer to execute:
a first calculation step of calculating a first positional shift amount based on data within an area having a predetermined first size, out of first image data representing a first image and second image data representing a second image, wherein the first image is based on a luminous flux that has passed through a first imaging optical system;
a setting step of setting a second size, which is a relative size of the area to the first and second image data, based on the size of the first positional shift amount and an optical characteristic of the first imaging optical system; and a second calculation step of calculating a second positional shift amount using the first image data and the second image data in the area having the second size, wherein, when an absolute value of the first positional shift amount is greater than a predetermined threshold, the setting unit sets the second size to be larger as the absolute vale of the first positional shift amount is greater.

16. A positional shift amount calculation method for a positional shift amount calculation apparatus to calculate a positional shift amount, which is a relative positional shift amount between a first image based on a luminous flux that has passed through a first imaging optical system, and a second image, the method comprising:

a first calculation step of calculating a first positional shift amount based on data within an area having a predetermined first size, out of first image data representing the first image and second image data representing the second image;

a setting step of setting a second size, which is a relative size of the area to the first and second image data, based on the size of the first positional shift amount and an optical characteristic of the first imaging optical system; and a second calculation step of calculating a second positional shift amount using the first image data and the second image data in the area having the second size, wherein, when an absolute value of the first positional shift amount is greater than a predetermined threshold, the setting unit sets the second size to be larger as the absolute vale of the first positional shift amount is greater.

* * * * *